(12) United States Patent
Hu et al.

(10) Patent No.: US 6,400,885 B1
(45) Date of Patent: Jun. 4, 2002

(54) CONTROLLABLE OPTICAL ATTENUATOR

(75) Inventors: Gongjian Hu, San Jose; Peter Robrish, San Francisco, both of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/641,541

(22) Filed: Aug. 18, 2000

(51) Int. Cl.[7] .............................. G02B 6/00; G02B 6/26; G02B 6/42
(52) U.S. Cl. ........................... 385/140; 385/15; 385/16; 385/18; 385/19
(58) Field of Search ........................... 385/140, 18, 19, 385/15, 16

(56) References Cited

U.S. PATENT DOCUMENTS

| | | | |
|---|---|---|---|
| 4,121,884 A | * 10/1978 | Greenwood | 385/16 |
| 4,384,761 A | * 5/1983 | Brady et al. | 385/23 |
| 4,505,539 A | * 3/1985 | Auracher | 385/19 |
| 5,619,600 A | * 4/1997 | Pohl | 385/140 |
| 5,699,462 A | * 12/1997 | Fouquet et al. | 385/18 |
| 5,732,168 A | * 3/1998 | Donald | 385/16 |

* cited by examiner

Primary Examiner—Brian Healy
Assistant Examiner—Kevin S Wood (57) ABSTRACT

A controllable optical attenuator comprising an optical waveguide which extends longitudinally along the optical attenuator. The optical waveguide has an exposed surface and a core that is positioned directly adjacent the exposed surface. The attenuator further comprises at least one elongated chamber which is formed transversely to the longitudinal extent of the optical waveguide and a liquid droplet which is disposed within the elongated chamber, the droplet being movable along the chamber from a position lateral of the optical waveguide exposed surface to a position in which contact is made between the liquid droplet and the optical waveguide exposed surface. When the liquid droplet is positioned so as to contact the exposed surface of the optical waveguide, a portion of the optical signal transmitted along the waveguide core is absorbed by the droplet so as to attenuate the transmitted signal.

20 Claims, 6 Drawing Sheets

CONTROLLABLE OPTICAL ATTENUATOR

FIELD OF THE INVENTION

The present disclosure relates to a controllable optical attenuator. More particularly, the disclosure relates to a controllable optical attenuator with which the attenuation of an optical signal can be quickly adjusted with minimal power consumption.

BACKGROUND OF THE INVENTION

Lasers are used in the communications field to transmit optical signals through communications networks. Although it is generally preferable that high power signals are transmitted to ensure accurate transmissions over long distances, it is often necessary to attenuate these signals to reduce their intensity. For instance, attenuation may be necessary to prevent saturation of nearby receivers. In addition, attenuation is often necessary when testing the dynamic range of a receiver.

Signal attenuation normally is provided by optical attenuators. Conventional attenuators typically comprise mechanical filter elements that are moved in and out of the transmission path. One common mechanical filter is the disk filter. Disk filters typically include a plurality of absorption filter elements arranged at various predetermined angular positions about the periphery of the disk. The various absorption filters of the disk can be independently placed within the transmission path under the driving force of a motor.

Although disk filters do provide attenuation of transmitted signals, their use presents several disadvantages. First, disk filters have relatively slow response times due to the time required for the filter mechanism to rotate the disk to the correct angular position. In addition, use of conventional disk filters normally results in high insertion losses due to the coupling losses associated with insertion of the filters between two waveguides. Because disk filters usually require a motor to drive the disk, disk filter mechanisms also tend to be bulky and are therefore ill-suited for portable applications. Moreover, because such mechanisms comprise several moving parts, regular maintenance normally is required for these mechanisms.

Non-mechanical attenuator designs have been created in an effort to avoid the aforementioned drawbacks of mechanical filters. In some designs, liquid crystal (LC) filters provide the desired attenuation. Although LC filters do not have many of the problems associated with conventional mechanical filters, LC filters present other disadvantages. For instance, LC filters are not bistable and therefore require power both in the switching and the holding states. In addition, LC filters are sensitive to temperature change. More particularly, the refractive index of LC filters can change in response to changes in ambient temperature. For this reason, LC filters can be difficult to control. Additionally, current designs of LC filters tend to have relatively small dynamic ranges and often have difficulties with backscattering.

From the foregoing, it can be appreciated that it would be desirable to have a controllable optical attenuator that responds quickly, consumes little power, has low insertion loss, and that has no moving parts.

SUMMARY OF THE INVENTION

The present disclosure relates to a controllable optical attenuator. The attenuator generally comprises an optical waveguide that extends longitudinally along the optical attenuator. The optical waveguide has an exposed surface and a core that is positioned directly adjacent the exposed surface. The attenuator further comprises at least one elongate chamber that is formed transversely to the longitudinal extent of the optical waveguide, with the exposed surface of the optical waveguide forming part of the chamber. In addition, the attenuator includes a liquid droplet that is disposed within the elongate chamber, the droplet being movable along the chamber from a position lateral of the optical waveguide exposed surface to a position in which contact is made between the liquid droplet and the optical waveguide exposed surface. When the liquid droplet is positioned so as to contact the exposed surface of the optical waveguide, a portion of the optical signal transmitted along the waveguide core is absorbed by the droplet so as to attenuate the transmitted signal.

In addition, the present disclosure relates to a method of attenuating a transmitted optical signal. The method comprises providing an optical transmission path along an optical waveguide, forming an elongate chamber transverse to the optical transmission path, providing a liquid droplet within the elongate chamber, and moving the liquid droplet along the elongate chamber from a position lateral of the optical transmission path to a position directly adjacent the optical transmission path such that a portion of the transmitted optical signal is absorbed by the liquid droplet.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
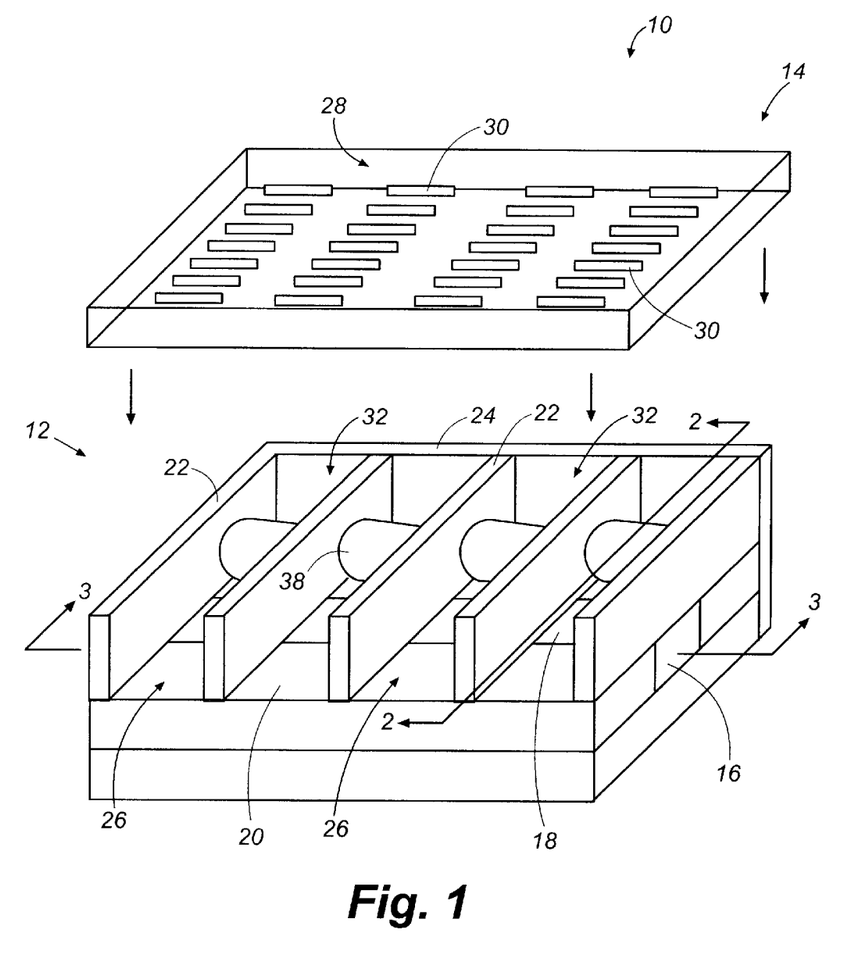
FIG. 1 is an exploded perspective view of a first embodiment of a controllable optical attenuator constructed in accordance with the present invention.

Referring now in more detail to the drawings, in which like numerals indicate corresponding parts throughout the several views, FIG. 1 illustrates a first embodiment of a controllable optical attenuator 10 constructed in accordance with the present invention. As indicated in this figure, the controllable optical attenuator 10 generally comprises a base 12 and a cover 14. Each of the base 12 and cover 14 typically is composed of a dielectric material such as a polymeric material. Extending longitudinally through the base 12 is an optical waveguide 16. The optical waveguide 16 is arranged within the base 12 such that an exposed surface 18 of the waveguide forms part of the top surface 20 of the base. This top surface 20 is substantially planar to provide a generally flat surface that can be traversed by liquid droplets, as is discussed below. Although the optical waveguide 16 is shown as having a rectangular cross-section in FIG. 1, it is to be appreciated that alternative configurations are possible. For instance, the optical waveguide 16 could be circular in cross-section, if desired.

The optical waveguide 16 is configured such that the core (not indicated) of the optical waveguide 16 is positioned directly adjacent the top surface 20 of the base 12. The cladding of the optical waveguide 16 can separate the waveguide core from the top surface 20 of the base 12. This cladding typically is only one micron (μm) to several microns in thickness such that, as is described in the discussion that follows, light signals transmitted along the waveguide 16 can pass out of the core to attenuate the optical transmission.

With further reference to FIG. 1, the base 12 also includes a plurality of transverse walls 22 that are arranged substantially perpendicularly to the longitudinal direction of the optical waveguide 16. Provided at the ends of these transverse walls 22 are side walls 24 (one of which is shown removed in FIG. 1 for clarity). The side walls 24 terminate the transverse walls 22 so as to form a plurality of transverse trenches 26 together with the top surface 20 of the base 12.

The cover 14 includes a two dimensional array 28 of electrodes 30 that are disposed on a bottom surface of the cover. Electrodes are arrayed along the length of each of the transverse trenches 26. These electrodes 30 are formed of a conductive material such as indium tin oxide (ITO), gold, silver, or aluminum and can be similar in construction to electrodes commonly used in liquid crystal displays. When the controllable optical attenuator 10 is assembled, the cover 14 is positioned atop the transverse and side walls 22 and 24 to enclose the trenches 26, forming transverse, elongate chambers 32. Each chamber 32 is sized to be wider than the wavelength of the optical signals transmitted along the optical waveguide 16. By way of example, each transverse chamber 32 can be approximately 20 μm in width (i.e., in the longitudinal direction of the waveguide 16). To avoid creation of air pressure differentials within the chamber 32 that could be caused by displacement by liquid droplets within the chamber (see below), ventilation holes (not shown) can be provided such that air can pass into and out of the chamber from the surrounding environment.

The base 12 also includes a plurality of electrodes 34 (FIGS. 2A–2C) that are of similar construction to electrodes 30 and that are also oriented in an array 36. These electrodes 34 are buried under the surface 20. Preferably, the first and second arrays 28 and 36 are arranged such that each electrode 30 disposed within the cover 14 has a corresponding opposed electrode 34 provided in the base 12. Accordingly, as is discussed in more detail below, the electrodes 30 and 34 form electrode pairs which, when provided with an appropriate voltage, form local electric fields. Although not illustrated, each of the electrodes 30 and 34 is electrically connected to conductor paths formed in the cover 14 and base 12 such that a voltage can be delivered to the electrodes.

Disposed in each of the transverse chambers 32 is a liquid droplet 38. Preferably, the liquid droplet 38 can comprise an oil-based liquid having a high dielectric constant. Oil-based liquids are preferred in that they are less susceptible to evaporation than water-based liquids and because they possess fewer ions and therefore are less susceptible to an electrolyzing effect. By way of example, the liquid can comprise a Series A refractive index liquid available from Cargille Laboratories, Inc. of Cedar Grove, N.J. Typically, the liquid droplets 38 are doped with a dye which increases the absorption coefficient of the droplets. Dyes presently deemed suitable for use in the present invention are IR-27 and IR-1048 available from Aldrich Chemical of Milwaukee, Wis. for the infrared band, and D-Series dyes (D1–D82) for the visible band available from Merck KGaA of Darmstadt, Germany. Although the concentration of the dye in the liquid used for the liquid droplets 38 will vary depending upon the particular results desired, the concentration typically ranges from approximately 0.4% to 5%. In that the chambers 32 are very small in size, and to ensure rapid and accurate displacement of the liquid droplets 38, the liquid droplets are small in volume, for instance, each possessing a volume of approximately $1.5 \times 10^{-13}$ L.

Figure 2A:
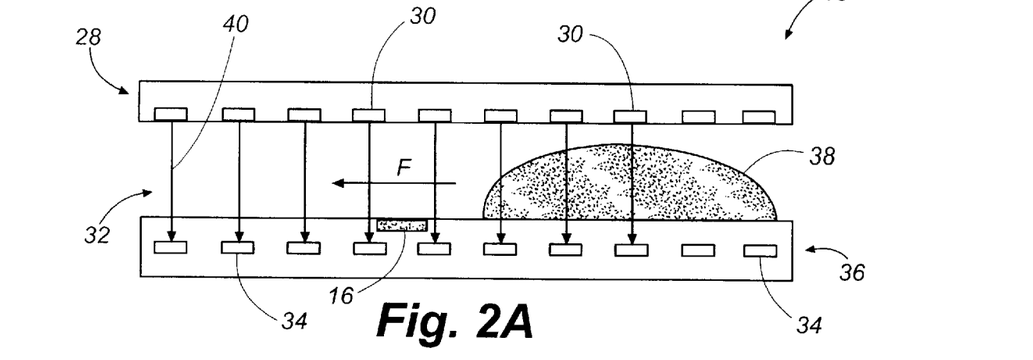
FIGS. 2A–2C are transverse cross-sectional views of the optical attenuator shown in FIG. 1 that illustrate displacement of an attenuation droplet.
Figure 2B:
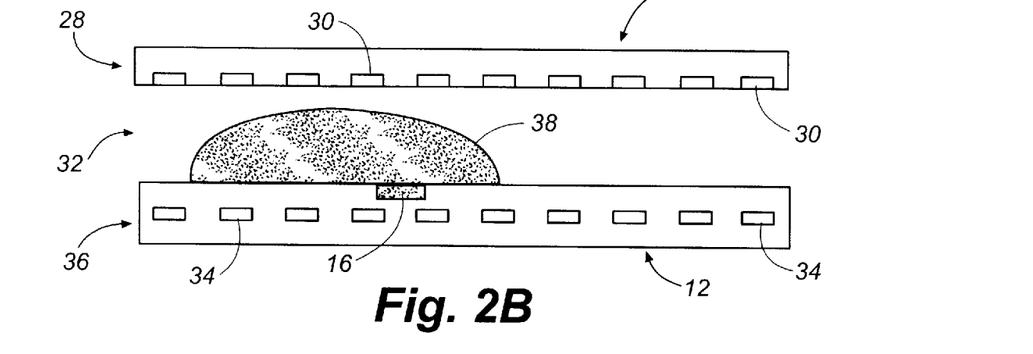
Figure 2C:
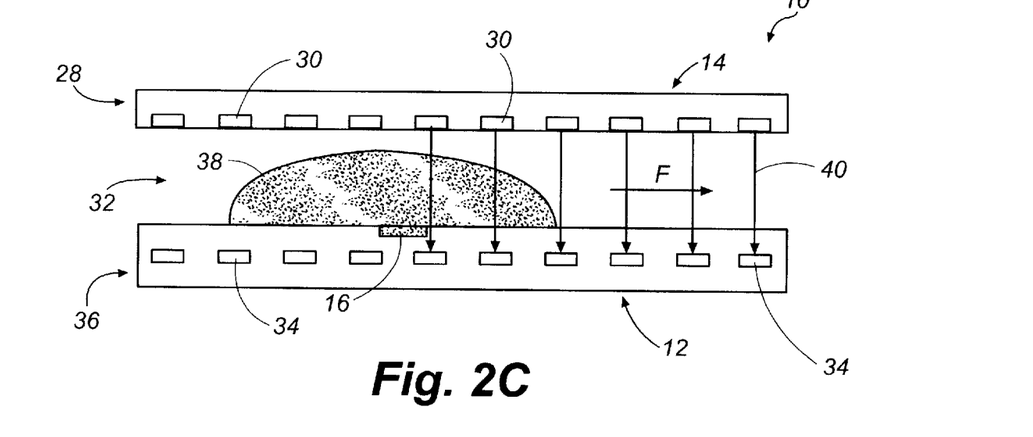

The general construction of the first embodiment of the controllable optical attenuator 10 having been described, use and operation of the attenuator 10 will now be discussed with reference to FIGS. 2A–2C. FIGS. 2A–2C illustrate schematic views of a transverse cross-section of a single attenuator chamber 32. FIG. 2A illustrates an off position of the chamber 32, i.e., a position in which the signal transmitted along the optical waveguide is not attenuated. In the off position, the liquid droplet 38 is positioned laterally of the waveguide 16 such that the liquid droplet does not overlap the exposed surface 18 of the waveguide 16. To attenuate the transmitted signal, the liquid droplet 38 is displaced so that it overlaps the portion of the optical waveguide 16 that extends along the chamber 32. As will be appreciated by persons having ordinary skill in the art, if the liquid droplet 38 has a refractive index that matches or exceeds the refractive index of the waveguide core, the optical signals traveling along the waveguide 16 will pass into the liquid droplet, thereby attenuating the signal.

To displace the liquid droplet 38 toward the waveguide 16 (i.e., to the left in FIG. 2A), a voltage is provided to the electrodes 30 and 34 to the left of the droplet such that the various electrode pairs to that side of the droplet form localized electric fields indicated with arrows 40 in FIG. 2A. These electric fields create an electric field gradient directed toward the left side of the chamber 32. Through dielectric effect, this electric field gradient exerts a moving force, F, on the liquid droplet 38. Where the electric field gradient at the droplet 38 is small, this force F is small. Where the electric field gradient at the droplet is large, such as when the electrodes to which the voltage are applied are close to or partially overlap the droplet 38, however, the moving force F can be greater than the net frictional, viscous, and surface tension forces acting on the liquid droplet 38. This force F therefore moves the droplet to the left as indicated in FIG. 2B to position the droplet. When the droplet overlaps the waveguide, the signal transmitted along the waveguide 16 is attenuated to a predetermined degree. The moving force F is maximized when the electric fields created by the electrode pairs create an electric field gradient that envelops approximately half of the droplet 38 as indicated in FIG. 2A. In a preferred mode of operation, the electrode pairs can be sequentially deactivated once movement is initiated so that half of the droplet is enveloped by the electric field gradient. In this manner, the maximum moving force F will be imposed upon the droplet for the full duration of its displacement.

Once the liquid droplet 38 has been moved to a position in which the droplet overlaps the waveguide 16 as shown in FIG. 2B, the voltage provided to the electrodes 30 and 34 can be removed. No electric field is required to maintain the droplet in its position. To remove the attenuation of the signals transmitted along the waveguide 16, the electrodes 30 and 34 to the right of the droplet can be provided with a voltage in similar manner as described above such that a moving force will be imparted to the droplet to move it back to its original position shown in FIG. 2A (see FIG. 2C). Again, once back in this original position, no voltage is required to maintain the liquid droplet 38 in place.

The amount of voltage necessary to move the liquid droplet 38 depends upon both the volume of the droplet and the surface tension acting upon it. To determine what voltage is necessary, the coulomb force acting on the droplet 38 must be larger than the surface tension applied by the chamber surfaces. This force is created by the electric field.

$$F = \frac{1}{2}(\varepsilon - 1)\varepsilon_0 \frac{a}{d} V^2 \qquad \text{[Equation 1]}$$

where F equals the force in Newtons that must be greater than surface tension on the liquid droplet 38, $\varepsilon$ equals the relative dielectric constant, $\varepsilon_0$ is the permittivity of free space, a is the width of the chamber 32 in meters, d is the height of the chamber in meters, and V is the voltage applied to the electrodes. By way of example, a potential difference of approximately 50 to 100 volts is considered adequate to effect the desired movement of a liquid droplet 38 having a volume of $1.5 \times 10^{-13}$ L. It is to be understood, however, that this required voltage depends upon the volume of the liquid droplet 38 as well as the response time desired. With an appropriate voltage, the liquid droplets 38 can be moved with great speed to minimize response time. By way of example, the liquid droplets 38 can be moved with an acceleration of approximately 300 m/s$^2$.

Figure 3A:
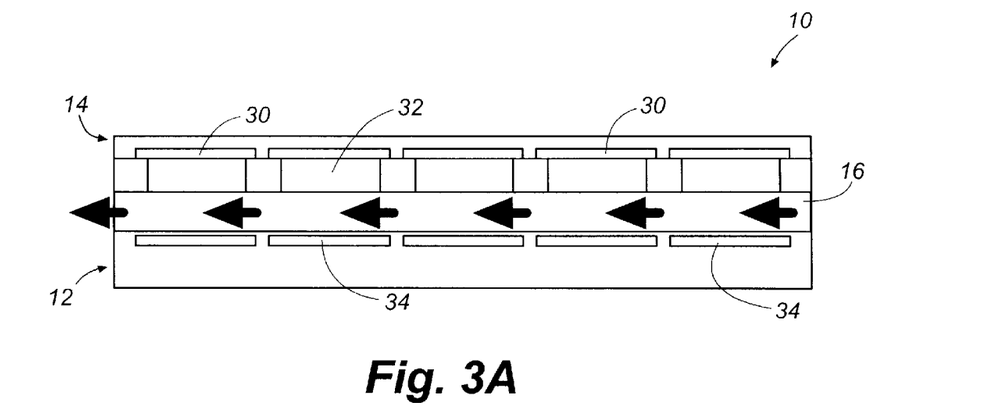
FIGS. 3A–3C are longitudinal cross-sectional views of the optical attenuator shown in FIG. 1 that illustrate various levels of attenuation.
Figure 3B:
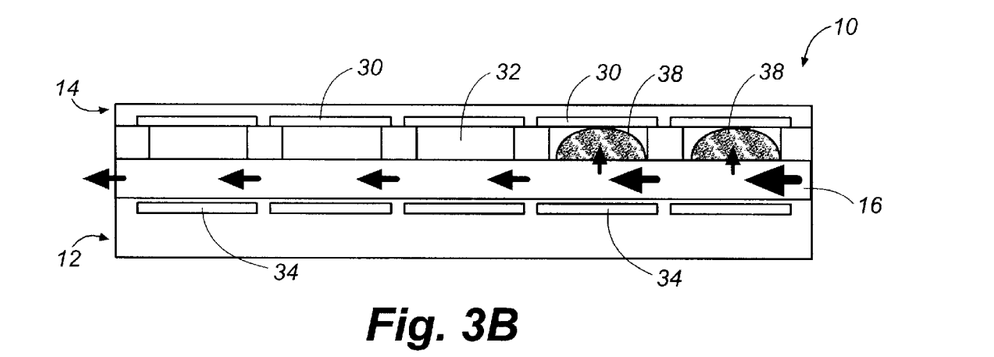
Figure 3C:
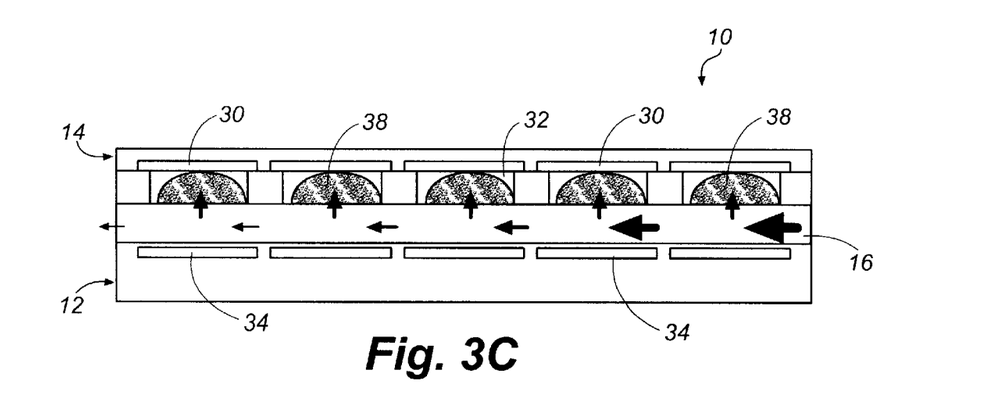

FIGS. 3A–3C illustrate the variability of the attenuation that can be provided with the controllable optical attenuator 10 of the present invention. In particular, FIGS. 3A–3C illustrate schematic views of a longitudinal cross-section of the optical attenuator 10 taken along the optical waveguide 16. FIG. 3A illustrates five different transverse chambers 32, each of which having a liquid droplet (not shown) disposed therein. As indicated in this figure, none of the liquid droplets is positioned over the optical waveguide 16. Consequently, no attenuation is provided to the optical signal transmitted along the waveguide 16. FIG. 3B, however, illustrates two liquid droplets 38 positioned over the optical waveguide 16. As shown in this figure, a portion of the optical signal traveling through the waveguide 16 passes into each of these droplets 38. As a result, a first measure of attenuation is achieved. In that only two of a possible five liquid droplets have been used to provide attenuation, FIG. 3B illustrates a partial attenuation scenario. In FIG. 3C, each of the five liquid droplets 38 is positioned directly over the waveguide 16 such that full attenuation is provided. As will be appreciated by persons having ordinary skill in the art, the amount of attenuation provided by each droplet will vary depending upon the particular liquid and/or dyes used in forming the liquid droplets 38. Moreover, it is to be appreciated that droplets 38 can comprise liquids of different colors. When this is done, only certain wavelengths or wavelength bands transmitted by the waveguide 16 are attenuated by droplets 38 of the corresponding color. Furthermore, it will be understood that increasing the number of chambers 32 will expand the dynamic range of attenuation available with the optical attenuator 10. By way of example, the range of attenuation can be approximately from 1 to $10^{-6}$.

The optical attenuator 10 described in the foregoing presents several advantages over conventional attenuators currently available in the communications field. First, in that the optical attenuator 10 is bistable, power is only needed when switching the individual optical attenuator chambers 32 from the on to the off position and vice versa. Accordingly, power consumption of the device is low. In addition, in that there are no moving parts except for the liquid droplets, response times are very low (e.g., 1 millisecond). Furthermore, because the optical attenuator 10 utilizes an optical waveguide 16 instead of some form of filter, the insertion loss created by the optical attenuator 10 is minimal. Moreover, unlike current liquid crystal filters, the optical attenuator 10 of the present disclosure is not susceptible to temperature changes. Further, in that the dye provided in the droplets 38 is an absorbing dye, backscattering is minimized.

Figure 4:
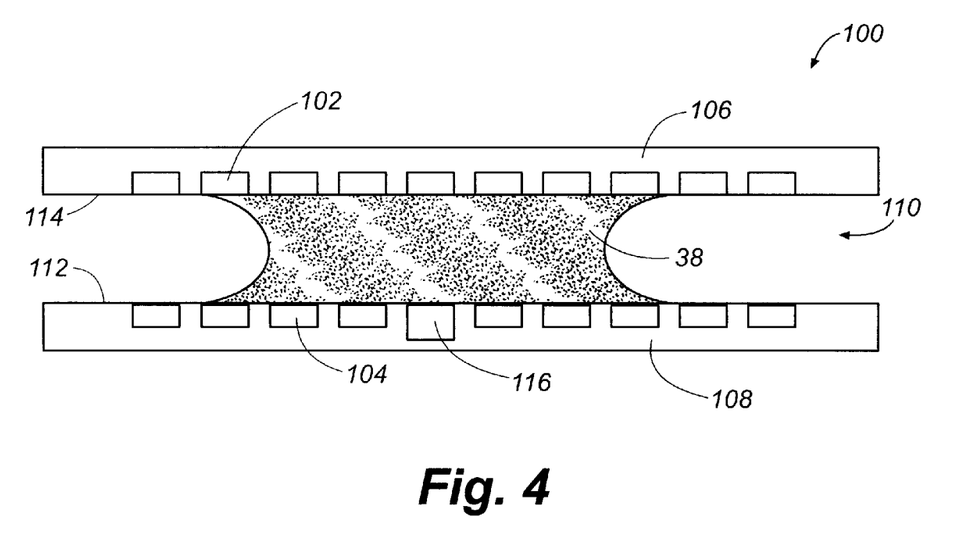
FIG. 4 is a second embodiment of an optical attenuator constructed in accordance with the present invention.

FIG. 4 illustrates a second embodiment of a controllable optical attenuator constructed in accordance with the present invention. In particular, shown is a schematic view of a transverse cross-section of an optical attenuator 100. The optical attenuator 100 of the second embodiment is similar in construction to that of the first embodiment shown in FIGS. 1–3, however, a thermocapillary pumping effect is used to move the droplets instead of the dielectric effect. To take advantage of this thermocapillary pumping effect, the optical attenuator 100 uses a plurality of heating elements 102 and 104 that are disposed in the cover 106 and base 108. As indicated in FIG. 4, the droplet 38 has a volume adequate to fill the chamber 110 such that the droplet contacts both the bottom and top surfaces 112 and 114 of the chamber.

Figure 5A:
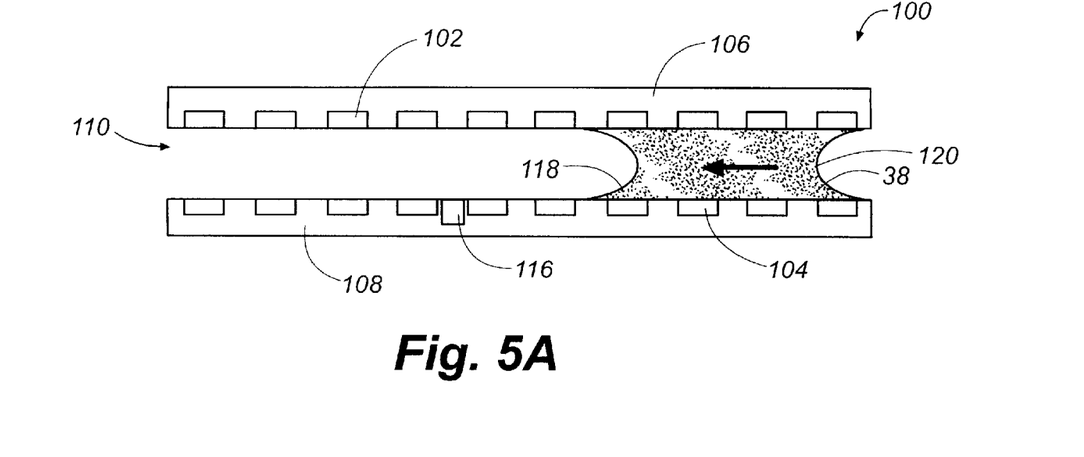
FIGS. 5A–5C are transverse cross-sectional views of the optical attenuator shown in FIG. 4 that illustrate displacement of an attenuation droplet.
Figure 5B:
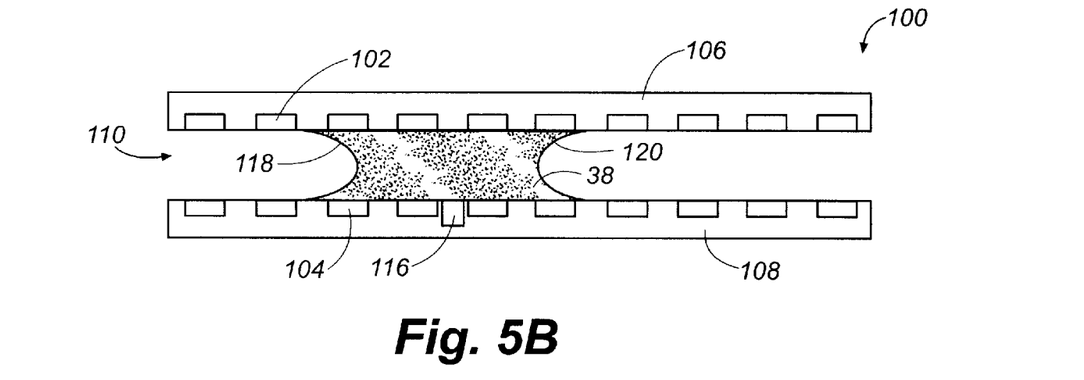
Figure 5C:
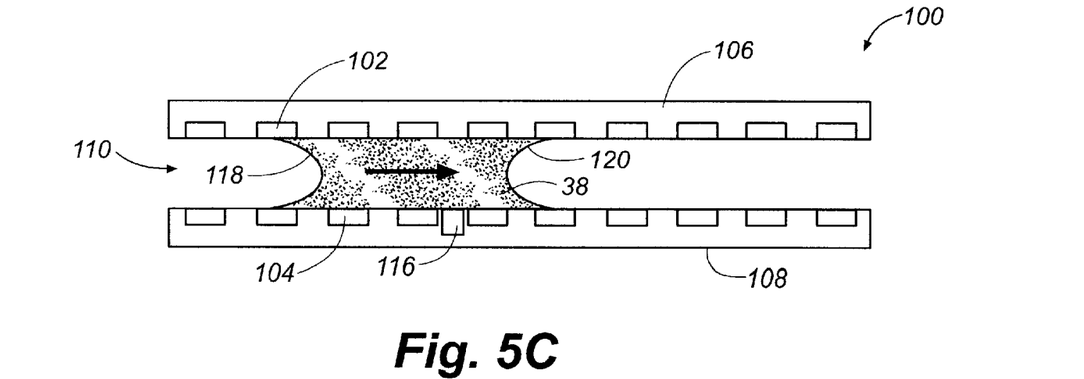

FIGS. 5A–5C illustrate movement of a droplet 38 along its chamber 110. As indicated in FIG. 5A, when the droplet 38 is disposed to the right (in the figure) of waveguide 116 such that it does not overlap the waveguide, attenuation will not be provided by the chamber 110. To move the droplet 38 to overlap the waveguide 116, ones of the heating elements 102 and 104 to the left of the droplet 38 are activated to heat the elements. This raises the temperature of the left meniscus 118 of the droplet 38 such that its temperature is greater than that of the right meniscus 120. This temperature difference between the menisci creates a capillary pressure difference in the droplet 38. The capillary pressure difference causes the droplet to move from right to left, as indicated in FIG. 5B. As with the first embodiment, once the droplet 38 has been moved into position over the waveguide 116, the surface tension forces acting on the droplet are great enough to maintain the droplet 38 in this position. To remove the attenuation, the droplet 38 then can be moved from left to right as indicated in FIG. 5C by activating the ones of heating elements 102 and 104 to the right of the droplet. Accordingly, just as with the first embodiment, power only needs to be provided to the optical attenuator 100 when movement of the droplet 38 is needed. The repeatability of the attenuator 100 is at least partially dependent upon the thermal dissipation rate of the device. Therefore, it may be advisable to heat the trailing meniscus 120 (FIG. 5B) after droplet movement has been initiated to decelerate the droplet. Manipulating the droplet in this manner may result in improved droplet control and faster switching.

Figure 6:
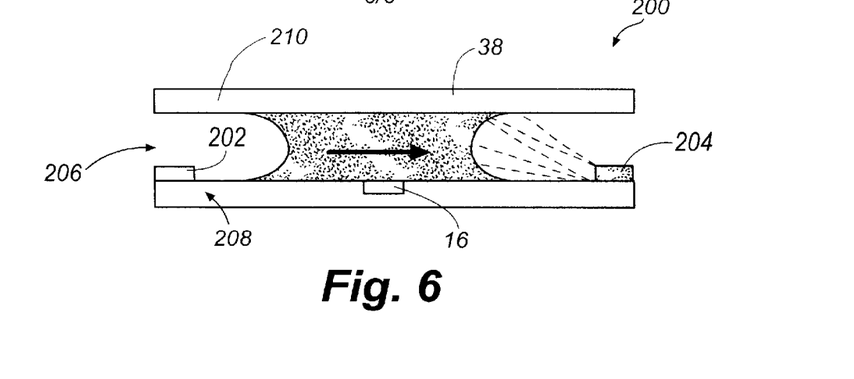
FIG. 6 is a third embodiment of an optical attenuator constructed in accordance with the present invention.
Figure 7:
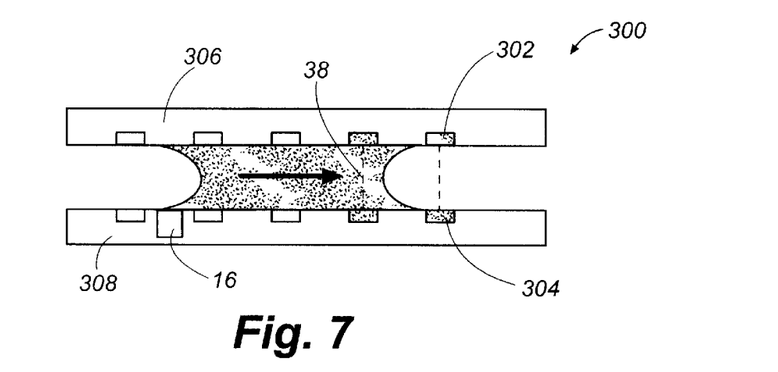
FIG. 7 is a fourth embodiment of an optical attenuator constructed in accordance with the present invention.
Figure 8:
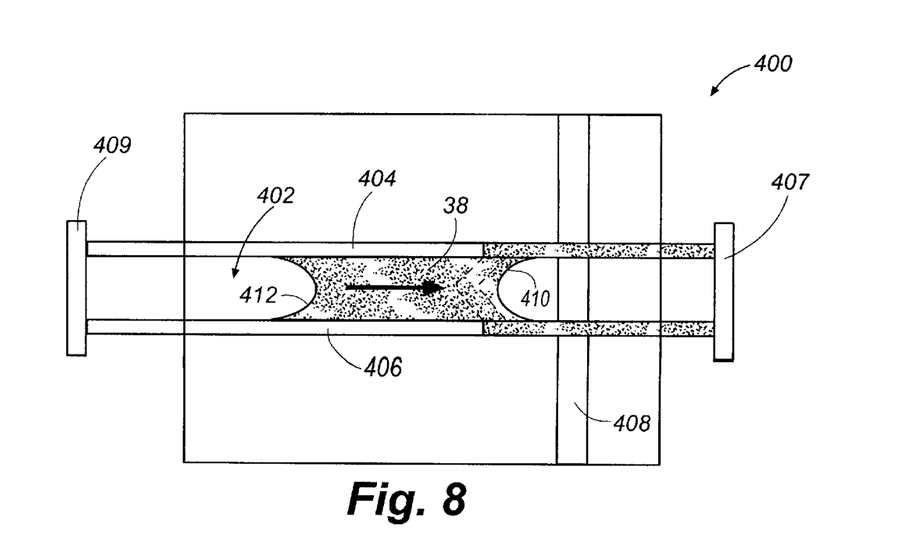
FIG. 8 is a fifth embodiment of an optical attenuator constructed in accordance with the present invention.

FIGS. 6–8 illustrate three different embodiments of the optical attenuator, each using light to move the droplet 38. In FIG. 6, an optical attenuator 200 is shown in transverse cross-section. The attenuator 200 utilizes two light sources 202 and 204 that are positioned at opposite ends of the chamber 206 formed with the base 208 and cover 210. Each of these light sources 202 and 204 can direct light toward the liquid droplet 38. For instance, as indicated in FIG. 6, light source 204 can shine light toward the liquid droplet 38. The liquid droplet 38 is provided with a dichroic dye that absorbs the light transmitted by the light sources 202 and 204. As the light beams impinging on the droplet 38 are absorbed by the dye, the dye is heated such that the meniscus 208 or the meniscus 210 is heated as in the second embodiment. Accordingly, the liquid droplet 38 can be imparted with a capillary pressure difference that will cause the liquid droplet 38 to move.

FIG. 7 illustrates an attenuator 300 in transverse cross-section. The attenuator includes a plurality of light sources 302 and 304 that are integrated into the attenuator cover 306 and base 308. By way of example, the light sources 302 and 304 can comprise light emitting diodes (LEDs) arranged in arrays such that several of the light sources can be illuminated simultaneously to create the thermocapillary effect by absorption by the dye in the droplet as described above. In use, several light sources 302 and 304 are illuminated to one side or the other of the droplet to generate the thermocapillary effect.

FIG. 8 illustrates a single chamber 402 of an attenuator 400 in a partial plan view. In this embodiment, the transverse walls 404 and 406 that encompass the bounds of the chamber 402 can be illuminated to move the droplet 38. In particular, these walls can be selectively illuminated from the left side or the right side of the waveguide 408 with light sources 407 and 409 such that light will travel along the walls 402 and 406 to the liquid droplet 38. Once arriving at the liquid droplet 38, the light energy is absorbed by the droplet's adjacent meniscus (meniscus 410 in FIG. 8) to create a pressure difference between the meniscus 410 and the opposite meniscus 412. The pressure difference creates a thermocapillary effect on the liquid droplet 38 to induce it to move.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although alternative driving mechanisms are disclosed, it is to be appreciated that two or more of these mechanisms could be combined. Moreover, the driving mechanisms described herein can also be used to decelerate the droplet once movement has been initiated, if desired.

What is claimed is:

1. A controllable optical attenuator, comprising:
    an elongate optical waveguide, said optical waveguide having an exposed surface and a core that is positioned directly adjacent said exposed surface;
    at least one elongate chamber disposed transversely to said optical waveguide, said exposed surface of said optical waveguide forming part of said chamber;
    a liquid droplet disposed within said elongate chamber; and means for moving said droplet along said chamber from a position lateral of said optical waveguide exposed surface to a position in which said liquid droplet overlaps and said optical waveguide exposed surface.

2. The attenuator of claim 1, said moving means including:
    electrode pairs disposed on opposed surfaces of said chamber; wherein said electrode pairs can be energized with a voltage to create electric fields within said chamber that induce movement of said liquid droplet along said chamber.

3. The attenuator of claim 1, said moving means including:
    heating elements disposed about said elongate chamber; wherein said heating elements can be activated to create heat that induces movement of said liquid droplet along said chamber.

4. The attenuator of claim 1, said moving means including:
    a light source positioned at opposed ends of said elongate chamber, wherein said light source can be activated to shine light on said liquid droplet to induce movement of said liquid droplet along said chamber.

5. The attenuator of claim 1, said moving means including:
    a plurality of light sources formed along said elongate chamber, wherein said light sources can be activated to shine light on said liquid droplet to induce movement of said liquid droplet along said chamber.

6. The attenuator of claim 1, additionally comprising transverse walls bounding said elongate chamber.

7. The attenuator of claim 6, additionally comprising means for selectively illuminating said transverse walls at opposed ends to induce movement of said liquid droplet along said chamber.

8. The attenuator of claim 1, wherein said liquid droplet comprises an index of refraction at least as large as said optical waveguide core.

9. The attenuator of claim 1, wherein said liquid droplet comprises an oil-based liquid.

10. The attenuator of claim 1, wherein said liquid droplet comprises a dye.

11. The attenuator of claim 10, wherein said dye comprises a dichroic dye.

12. A method of attenuating a transmitted optical signal, comprising:
    providing an optical waveguide having an outer surface;
    providing a liquid droplet; and
    moving the liquid droplet from a position lateral of the optical waveguide to contact the outer surface of the optical waveguide such that a portion of the transmitted optical signal will be absorbed by the liquid droplet.

13. The method of claim 12, wherein the liquid droplet is moved by creating a electric field to which the droplet is attracted.

14. The method of claim 12, wherein the liquid droplet is moved by heating a meniscus of the droplet.

15. A controllable optical attenuator, comprising:
    a chamber having an exposed surface;
    an optical waveguide core that extends transversely relative to the chamber, the core being positioned adjacent the exposed surface of the chamber;
    liquid disposed within the chamber; and
    a mechanism that is configured to displace the liquid in the chamber from a position lateral of the optical waveguide core to a position in which the liquid overlaps the optical waveguide core.

16. The attenuator of claim 15, the mechanism including:
    electrode pairs disposed on opposed, surfaces of the chamber, wherein the electrode pairs can be energized with a voltage to create electric fields within the chamber which induce movement of the liquid along the chamber.

17. The attenuator of claim 15, the mechanism including:

heating elements disposed about the chamber, wherein the heating elements can be activated to create heat which induces movement of the liquid droplet along the chamber.

18. The attenuator of claim 15, the mechanism including:

a light source positioned at opposed ends of the chamber, wherein the light source can be activated to shine light on the liquid to induce movement of the liquid along the chamber.

19. The attenuator of claim 15, the mechanism including:

a plurality of light sources provided along the chamber, wherein the light sources can be activated to shine light on the liquid to induce movement of the liquid along the chamber.

20. The attenuator of claim 15, wherein the attenuator comprises a plurality of chambers arranged transversely relative to the optical waveguide core, each chamber including liquid and a mechanism that is configured to displace the liquid in the chamber.

* * * * *